(12) United States Patent  
Park (10) Patent No.: US 10,877,349 B2  
(45) Date of Patent: Dec. 29, 2020

(54) FOURIER-TRANSFORM INTERFEROMETER USING META SURFACE

(71) Applicant: SAMSUNG ELECTRONICS CO., LTD., Suwon-si (KR)

(72) Inventor: Yeonsang Park, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/710,025

(22) Filed: Dec. 11, 2019

(65) Prior Publication Data

US 2020/0110323 A1 Apr. 9, 2020

Related U.S. Application Data

(62) Division of application No. 16/188,825, filed on Nov. 13, 2018, now Pat. No. 10,627,695.

(30) Foreign Application Priority Data

Nov. 21, 2017 (KR) .......................... 10-2017-0155810

(51) Int. Cl.
  *H04B 10/67* (2013.01)
  *G02F 1/21* (2006.01)
  (Continued)

(52) U.S. Cl.
  CPC ........... *G02F 1/21* (2013.01); *G01B 9/02028* (2013.01); *G01B 9/02051* (2013.01);
  (Continued)

(58) Field of Classification Search
  CPC .................................. H04B 10/66; H04B 10/67
  See application file for complete search history.

(56) References Cited

U.S. PATENT DOCUMENTS 5,600,440 A 2/1997 Bendall
6,016,199 A 1/2000 Newton
(Continued)

FOREIGN PATENT DOCUMENTS

JP 5677692 B2 2/2015

OTHER PUBLICATIONS

Eltagoury et al., "Novel Fourier transform infrared spectrometer architecture based on cascaded Fabry-Perot interferometers", Proc. SPIE 9760, Mar. 2016 (Year: 2016).*

(Continued)

*Primary Examiner* — Shi K Li
(74) *Attorney, Agent, or Firm* — Sughrue Mion, PLLC (57) ABSTRACT

A Fourier-transform interferometer includes a phase change plate including a reflective layer configured to reflect a first light that is incident, and a meta surface configured to locally and differently change a phase of the first light that is reflected. The Fourier-transform interferometer further includes a photodetector configured to detect a second light, and a transflective mirror and a mirror configured to transmit a first part of a third light that is incident, to the phase change plate, transmit a remaining part of the third light, to the photodetector, and transmit the first light of which the phase is locally and differently changed, to the photodetector. The photodetector is further configured to detect an interference pattern between the remaining part of the third light and the first light of which the phase is locally and differently changed.

10 Claims, 9 Drawing Sheets

(51) Int. Cl.
*G02F 1/19* (2019.01)
*G01J 3/26* (2006.01)
*G01J 3/45* (2006.01)
*G01J 3/02* (2006.01)
*G01B 9/02* (2006.01)
*G01J 3/453* (2006.01)

(52) U.S. Cl.
CPC .............. *G01J 3/021* (2013.01); *G01J 3/0208* (2013.01); *G01J 3/26* (2013.01); *G01J 3/45* (2013.01); *G01J 3/4531* (2013.01); *G01J 3/4532* (2013.01); *G02F 1/19* (2013.01); *G02F 2001/213* (2013.01); *G02F 2001/215* (2013.01)

(56) References Cited

U.S. PATENT DOCUMENTS

| | | |
|---|---|---|
| 7,844,145 B1 | 11/2010 | Waters |
| 8,655,189 B2 | 2/2014 | Almassy et al. |
| 9,228,897 B2 | 1/2016 | Sloan et al. |
| 2006/0232781 A1* | 10/2006 | Kranz ................... G01J 3/4532 356/451 |
| 2012/0281223 A1 | 11/2012 | Mortimer |
| 2015/0029504 A1 | 1/2015 | Auner et al. |
| 2016/0316180 A1 | 10/2016 | Han et al. |
| 2016/0349423 A1 | 12/2016 | Etchin et al. |
| 2017/0030773 A1 | 2/2017 | Han et al. |
| 2017/0082842 A1 | 3/2017 | Shaltout et al. |

OTHER PUBLICATIONS

"Fourier-transform infrared spectroscopy" Wikipedia, Oct. 15, 2018 [retrieved from https://en.wikipedia.org/wiki/Fourier-transform_infrared_spectroscopy ] 9 pages total.

Hou-Tong Chen et al "A review of metasurfaces: physics and applications" Reports on Progress in Physics, Mar. 9, 2016 (60 pages total).

Marco Pisani et al. "Compact imaging spectrometer combining Fourier transform spectroscopy with a Fabry-Perot interferometer" Optics Express, vol. 17, No. 10, May 11, 2009 (pp. 8319-8331).

Communication dated Feb. 18, 2019, issued by the European Patent Office in counterpart European Patent Application No. 18206731.4.

* cited by examiner

FIG. 15

FOURIER-TRANSFORM INTERFEROMETER USING META SURFACE

CROSS-REFERENCE TO RELATED APPLICATION

This is a divisional application of U.S. application Ser. No. 16/188,825, filed Nov. 13, 2018, in the U.S. Patent and Trademark Office, which claims priority from Korean Patent Application No. 10-2017-0155810, filed on Nov. 21, 2017, in the Korean Intellectual Property Office, the disclosures of which are incorporated by reference herein in their entireties.

BACKGROUND

1. Field

Apparatuses consistent with embodiments relate to a Fourier transform interferometer and, more particularly, to a Fourier transform interferometer using a meta surface.

2. Description of the Related Art

An interferometer is a device that divides light from the same light source into two paths, allows the light to travel on the different paths, and then observes an interference phenomenon caused by allowing the light traveling on the different paths to meet again. Various measurements such as a distance, an angle, a temperature change, an object displacement, an object deformation, a refractive index of medium, a biological sample analysis, etc. may be possible by using the interferometer. Also, a spectrum distribution of incident light may be analyzed through a Fourier analysis on an interference pattern.

Recently, because an interest in convergence technology has increased, various measurements, a bio-analysis, and image editing have been attempted by using a small electronic device, such as a smart phone, equipped with the interferometer. However, because the conventional Fourier transform interferometer has a structure to move a mirror to momentarily change the phase of the reflected light, it is difficult to manufacture the Fourier transform interferometer in a small chip form.

SUMMARY

According to embodiments, a Fourier-transform interferometer includes a phase change plate including a reflective layer configured to reflect a first light that is incident, and a meta surface configured to locally and differently change a phase of the first light that is reflected. The Fourier-transform interferometer further includes a photodetector configured to detect a second light, and a transflective mirror and a mirror configured to transmit a first part of a third light that is incident, to the phase change plate, transmit a remaining part of the third light, to the photodetector, and transmit the first light of which the phase is locally and differently changed, to the photodetector. The photodetector is further configured to detect an interference pattern between the remaining part of the third light and the first light of which the phase is locally and differently changed.

The phase change plate may further include a substrate, the reflective layer may be disposed on the substrate, the meta surface may be disposed on the reflective layer, and the meta surface may include a plurality of phase change elements having different diameters.

The plurality of phase change elements may have columnar shapes vertically protruding from the reflective layer.

The phase change plate may include a first meta region and a second meta region that differently change the phase of the first light that is reflected.

The phase change plate may include first phase change elements disposed in the first meta region, and second phase change elements disposed in the second meta region.

Each of the first phase change elements may have a first diameter, and each of the second phase change elements may have a second diameter different from the first diameter.

Each of the different diameters of the plurality of phase change elements may be less than a wavelength of light to be analyzed.

Each of refractive indices of the plurality of phase change elements may be higher than a refractive index of the substrate.

The photodetector may be disposed toward a first surface of the transflective mirror, the mirror and the phase change plate may be disposed toward a second surface opposite to the first surface of the transflective mirror, and the transflective mirror may be disposed such that the third light is incident on the first surface of the transflective mirror.

The transflective mirror may be disposed opposite an upper surface of the phase change plate, and the mirror and the photodetector may be respectively disposed on both sides of the transflective mirror.

The Fourier-transform interferometer may further include a substrate, and the transflective mirror, the phase change plate, the mirror, and the photodetector may be disposed on the substrate.

The Fourier-transform interferometer may further include a light source configured to irradiate a fourth light toward a sample.

According to embodiments, a Fourier-transform interferometer includes a transflective mirror configured to transmit a first part of a first light that is incident, and reflect a remaining part of the first light, a phase change plate disposed opposite to the transflective mirror and including a meta surface configured to locally and differently change a phase of a second light that is incident, and a photodetector configured to detect an interference pattern between a third light that is transmitted through the phase change plate.

The phase change plate may further include a transflective substrate configured to transmit a second part of the second light, and reflect a third part of the second light, the meta surface may be disposed on the substrate, and the meta surface may include a plurality of phase change elements having different diameters.

The plurality of phase change elements may have columnar shapes vertically protruding from the substrate.

The phase change plate may include a first meta region and a second meta region that differently change the phase of the third part of the second light that is reflected.

The phase change plate may include first phase change elements disposed in the first meta region, and second phase change elements disposed in the second meta region.

Each of the first phase change elements may have a first diameter, and each of the second phase change elements may have a second diameter different from the first diameter.

Each of the different diameters of the plurality of phase change elements may be less than a wavelength of light to be analyzed.

Each of refractive indices of the plurality of phase change elements may be higher than a refractive index of the substrate.

The photodetector, the phase change plate, and the transflective mirror may be sequentially arranged in a vertical direction.

The Fourier-transform interferometer may further include a substrate, and the transflective mirror, the phase change plate, and the photodetector may be sequentially arranged in a lateral direction on the substrate.

The Fourier-transform interferometer may further include a light source configured to irradiate a fourth light toward a sample.

According to embodiments, a Fourier-transform interferometer includes a mirror, a phase change plate, a photodetector, and a transflective mirror configured to transmit a first part of a first light that is incident, to the phase change plate, and reflect a second part remaining of the first light, to the photodetector. The phase change plate is configured to reflect the first part of the first light that is transmitted, and change a phase of the first part of the first light that is reflected, to generate a second light, the transflective mirror is further configured to reflect a third part of the second light that is generated, to the mirror, the mirror is configured to reflect the third part of the second light reflected by the transflective mirror, the transflective mirror is further configured to transmit a fourth part of the third part of the second light reflected by the mirror, and the photodetector is configured to detect an interference pattern between the second part remaining of the first light and the fourth part of the third part of the second light that is transmitted.

BRIEF DESCRIPTION OF THE DRAWINGS

The above and/or other aspects will become apparent and more readily appreciated from the following description of embodiments, taken in conjunction with the accompanying drawings in which.

DETAILED DESCRIPTION

Hereinafter, with reference to the accompanying drawings, a Fourier transform interferometer using a meta surface will be described in detail. Like reference numerals refer to like elements throughout, and in the drawings, sizes of elements may be exaggerated for clarity and convenience of explanation. The embodiments described below are an example, and various modifications may be possible from the embodiments. In a layer structure described below, an expression "above" or "on" may include not only "immediately above/below/left/right in a contact manner" but also "above/below/left/right in a non-contact manner."

Figure 1:
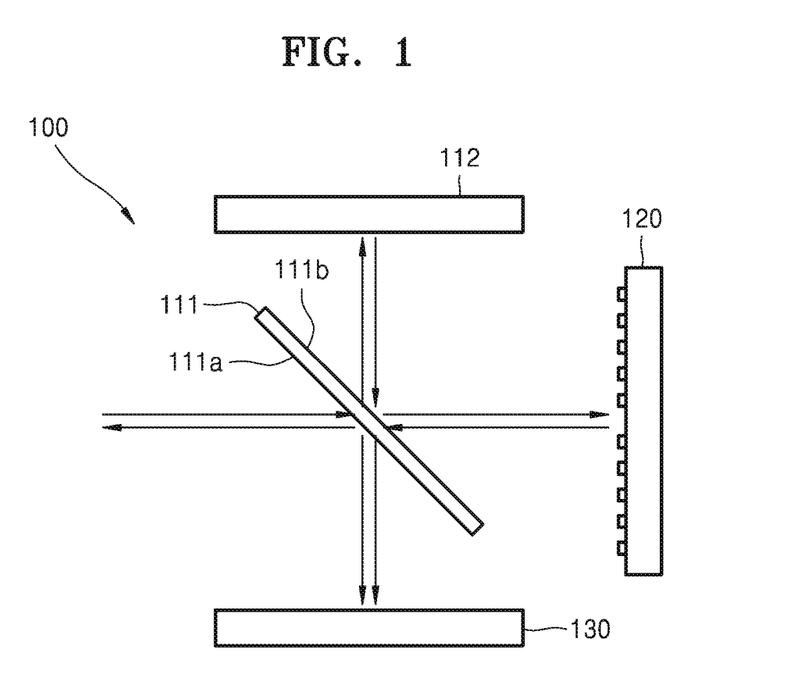
FIG. 1 shows a schematic configuration of a Fourier transform interferometer according to an embodiment.

FIG. 1 shows a schematic configuration of a Fourier transform interferometer 100 according to an embodiment. Referring to FIG. 1, the Fourier transform interferometer 100 according to an embodiment may include a transflective mirror 111 that transmits a part of an incident light and reflects a remaining part of the incident light, a phase change plate 120 that reflects the incident light and locally changes a phase of the reflected light differently, a mirror 112 that reflects the light reflected from the phase change plate 120 toward the transflective mirror 111, and a photodetector 130 that detects light.

For example, the photodetector 130 may be disposed toward a first surface 111a of the transflective mirror 111, and the mirror 112 and the phase change plate 120 may be disposed toward a second surface 111b, which is an opposite surface to the first surface 111a of the transflective mirror 111. The transflective mirror 111 may be disposed where an incident light to be analyzed is incident on the first surface 111a of the transflective mirror 111. Also, the photodetector 130 and the mirror 112 may be disposed on both sides of the transflective mirror 111.

In this configuration, a part of the incident light that is incident on the first surface 111a of the transflective mirror 111 and is to be analyzed transmits through the transflective mirror 111, and a remaining part of the incident light to be analyzed is reflected by the transflective mirror 111. A part of the incident light transmitted through the transflective mirror 111 is reflected by the phase change plate 120. The phase change plate 120 locally and differently changes the phase of the reflected light. Therefore, the light reflected by the phase change plate 120 has various phases according to a cross-sectional area of a beam. Then, a part of the light reflected from the phase change plate 120 is reflected by the second surface 111b of the transflective mirror 111 and is incident on the mirror 112. A part of the light reflected by the mirror 112 transmits through the transflective mirror 111 and is incident on the photodetector 130.

The light reflected from the first surface 111a of the transflective mirror 111 is also incident on the photodetector 130. Therefore, the light not incident on the phase change plate 120 and the light reflected from the phase change plate 120 are incident on the photodetector 130. As a result, an interference pattern is formed between the light not incident on the phase change plate 120 and the light reflected from the phase change plate 120 in the incident light. Therefore, the photodetector 130 may detect the interference pattern between the light not incident on the phase change plate 120 and the light reflected from the phase change plate 120 in the incident light. Then, a spectrum distribution of the incident light may be analyzed by using a Fourier analysis method using the interference patterns detected by the photodetector 130.

In FIG. 1, the photodetector 130 and the mirror 112 are disposed on opposite sides of the transflective mirror 111, and the phase change plate 120 is disposed toward a direction in which the incident light is incident on the transflective mirror 111. However, embodiments are not necessarily limited thereto.

Figure 2:
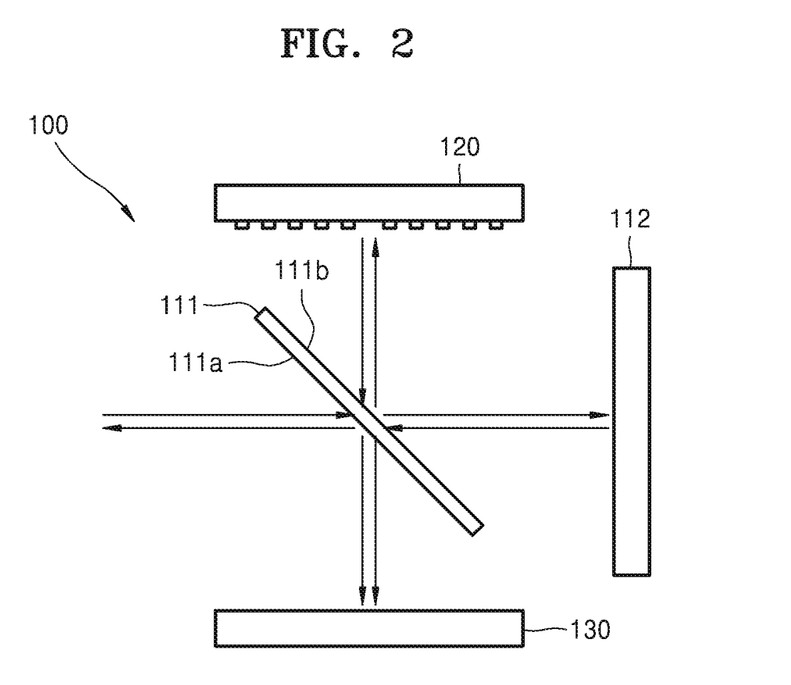
FIG. 2 shows a schematic configuration of a Fourier transform interferometer according to another embodiment.

FIG. 2 shows a schematic configuration of the Fourier transform interferometer 100 according to another embodiment. Compared with FIG. 1, positions of the phase change plate 120 and the mirror 112 are exchanged in FIG. 2. Therefore, the photodetector 130 and the phase change plate 120 are disposed on opposite sides of the transflective mirror 111, and the mirror 112 is disposed toward a direction in which the incident light is incident on the transflective mirror 111.

In this configuration, a part of an incident light that is incident on the first surface 111a of the transflective mirror 111 and is to be analyzed transmits through the transflective mirror 111 and then is incident on the mirror 112, and a remaining part of the incident light to be analyzed is reflected by the first surface 111a of the transflective mirror 111 and is incident on the photodetector 130. The light transmitted through the transflective mirror 111 is reflected by the mirror 112 and is incident on the second surface 111b of the transflective mirror 111. A part of the light incident on the second surface 111b of the transflective mirror 111 is reflected by the second surface 111b of the transflective mirror 111 and is incident on the phase change plate 120. The phase change plate 120 reflects the incident light and locally and differently changes a phase of the reflected light. Then, a part of the light reflected by the phase change plate 120 transmits through the transflective mirror 111 and is incident on the photodetector 130.

Also, in FIG. 1, the photodetector 130 is disposed toward the first surface 111a of the transflective mirror 111 and the mirror 112 and the phase change plate 120 are disposed toward the second surface 111b. However, embodiments are not necessarily limited thereto.

Figure 3:
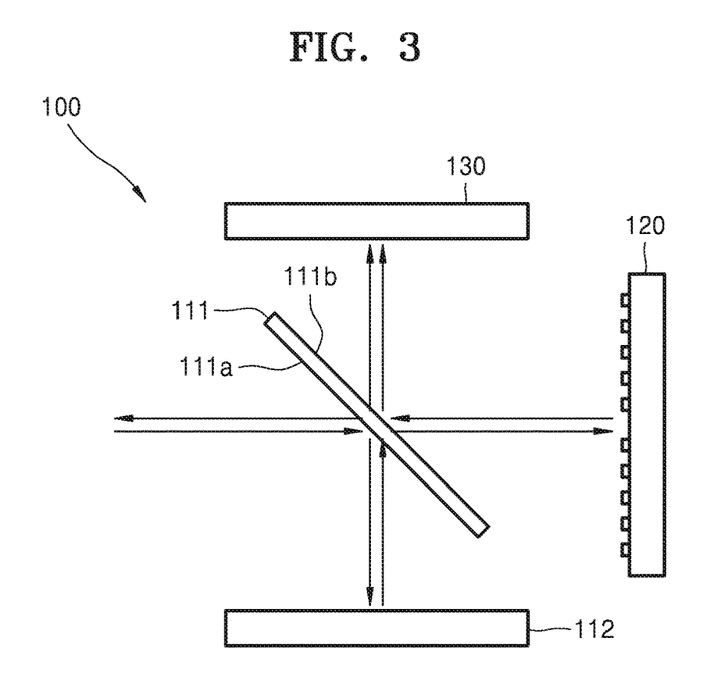
FIG. 3 shows a schematic configuration of a Fourier transform interferometer according to another embodiment.

FIG. 3 shows a schematic configuration of the Fourier transform interferometer 100 according to another embodiment. Compared with FIG. 1, positions of the photodetector 130 and the mirror 112 are exchanged in FIG. 3. Therefore, the mirror 112 may be disposed toward the first surface 111a of the transflective mirror 111, and the photodetector 130 and the phase change plate 120 may be disposed toward the second surface 111b of the transflective mirror 111.

In this configuration, a part of the incident light that is incident on the first surface 111a of the transflective mirror 111 and is to be analyzed transmits through the transflective mirror 111 and is incident on the phase change plate 120, and a remaining part of the incident light to be analyzed is reflected by the first surface 111a of the transflective mirror 111 and is incident on the mirror 112. A part of the light reflected by the mirror 112 transmits through the transflective mirror 111 and is incident on the photodetector 130. Further, the phase change plate 120 reflecting the incident light and changes a phase of the reflected light locally and differently. Then, a part of the light reflected by the phase change plate 120 is reflected by the second surface 111b of the transflective mirror 111 and is incident on the photodetector 130.

As described above, various configurations may be possible to allow the light not incident on the phase change plate 120 and the light reflected from the phase change plate 120 to be incident on the photodetector 130 of the incident light. Accordingly, the Fourier transform interferometer 100 according to the present embodiment may have various arrangements of the transflective mirror 111 and the mirror 112 for transmitting a part of the incident light to the phase change plate 120, transmitting a remaining part of the incident light to the photodetector 130, and transmitting the light reflected from the phase change plate 120 in the incident light to the photodetector 130.

The incident light that is incident on the first surface 111a of the transflective mirror 111, which may be light to be analyzed, may be light directly from an external test target light source such as a laser or may be light reflected, transmitted, or scattered from an external sample or subject. When the Fourier transform interferometer 100 is used for analyzing a sample, the Fourier transform interferometer 100 may further include a light source.

Figure 4:
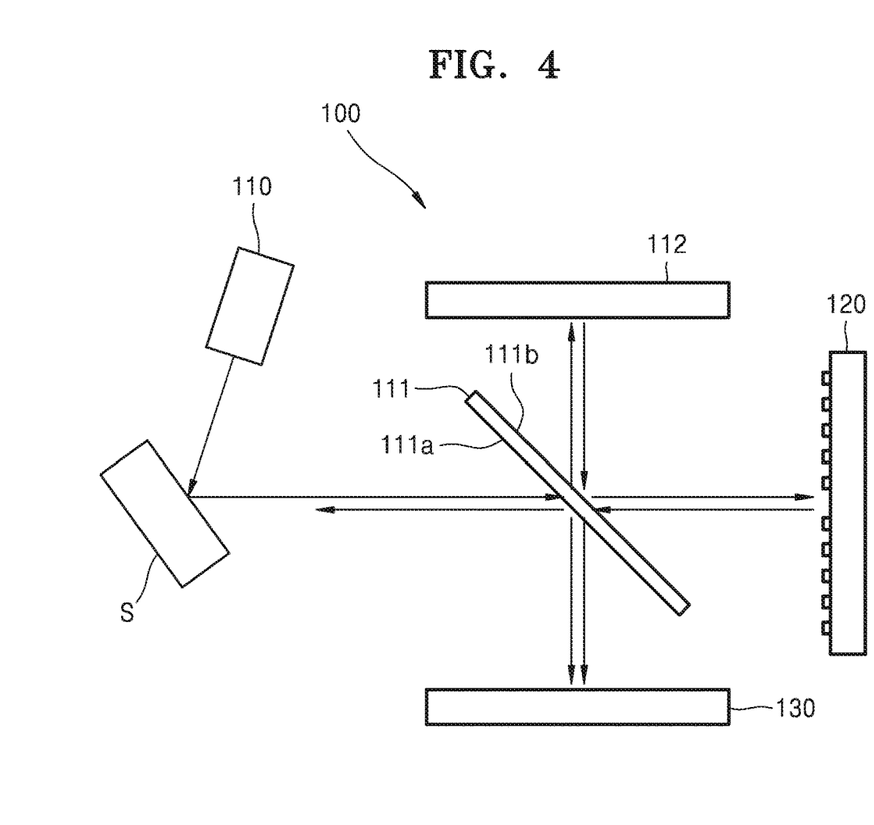
FIG. 4 shows a schematic configuration of a Fourier transform interferometer according to another embodiment.

FIG. 4 shows a schematic configuration of the Fourier transform interferometer 100 according to another embodiment. Referring to FIG. 4, the Fourier transform interferometer 100 may further include a light source 110 for irradiating a sample S with light. In this case, the sample S, the light source 110, and the transflective mirror 111 may be disposed where light reflected, transmitted or scattered from the sample S irradiated by the light source 110 is incident on the first surface 111a of the transflective mirror 111.

Figure 5:
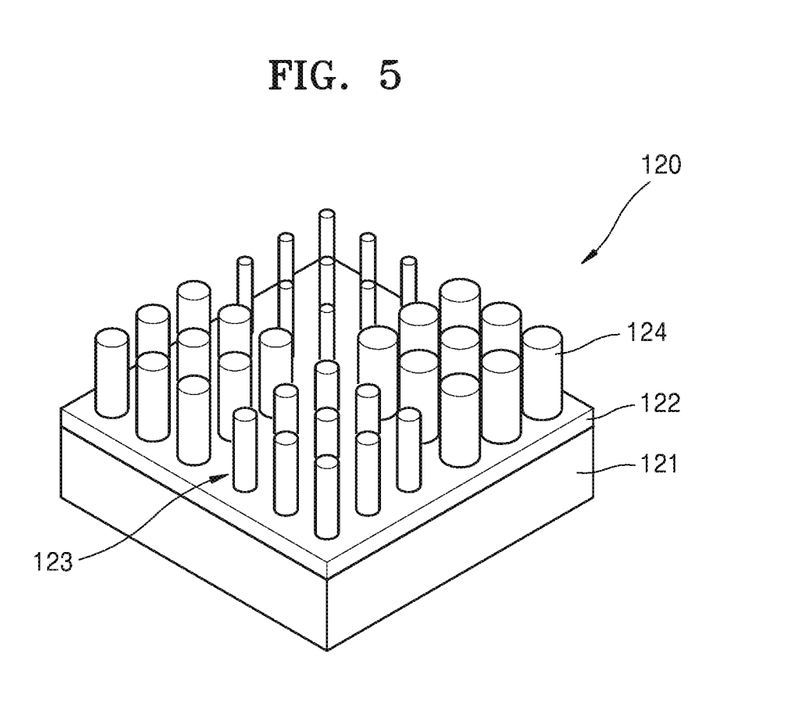
FIG. 5 is a perspective view showing a schematic configuration of a phase change plate of the Fourier transform interferometer shown in FIG. 1.

FIG. 5 is a perspective view showing a schematic configuration of the phase change plate 120 of the Fourier transform interferometer 100 shown in FIG. 1. Referring to FIG. 5, the phase change plate 120 for locally changing a phase of reflected light may include a substrate 121, a reflective layer 122 disposed on the substrate 121, and a meta-surface 123 disposed on the reflective layer 122 and locally and differently changing the phase of the reflected light. The phase change plate 120 may be disposed where the reflection layer 122 and the meta surface 123 face the transflective mirror 111.

The meta surface 123 may include a plurality of phase change elements 124 having a plurality of different diameters. For example, the plurality of phase change elements 124 may have columnar shapes that protrude vertically on the reflective layer 122. The phase change elements 124 have cylindrical shapes in FIG. 5 but are not limited thereto. For example, the phase change elements 124 may have elliptical column shapes or rectangular column shapes wherein the phase change plate 120 has a polarization-dependent characteristic.

The substrate 121 may be formed of glass or plastic material in the form of a flat plate. The phase change elements 124 may be formed of a material having a higher refractive index than that of the substrate 121. For example, the phase change elements 124 may be formed of a material having a high refractive index selected from the group consisting of germanium (Ge), amorphous silicon (a-Si), polycrystalline silicon (p-Si), crystalline silicon (c-Si), group III-V compound, SiNx, $SiO_2$, TiO, $TiO_2$, $TiO_3$, GaP, $Al_2O_3$, $HfO_2$, and the like. A refractive index of the phase change element 124 may be greater than 3.5 at, for example, a visible light wavelength. Alternatively, the phase change elements 124 may be formed of a metallic material. These phase change elements 124 may be easily formed using a general semiconductor patterning process. For example, after depositing material layers of the phase change elements 124 on the reflective layer 122, the phase change elements 124 may be formed simply by patterning the phase change element material layers using a photolithography process and an etch process. Therefore, a complicated processing operation is not required to form the phase change plate 120.

Pitches between the phase change elements 124 and diameters of the phase change elements 124 may be much less than a wavelength of light to be analyzed. Then, a phase may be delayed because the incident light passes through the phase change elements 124 of the high refractive index, and thus a phase of reflected light by the phase change plate 120 is different from the phase of the incident light. A phase change degree may vary according to parameters such as an arrangement, diameters, pitches, cross-sectional shapes, heights, and refractive indices of the phase change elements 124. To simplify a manufacturing process of the phase change plate 120, the plurality of phase change elements 124 may be simply two-dimensionally arranged, and the phase of the reflected light may be adjusted only by the pitch and diameter of each of the phase change elements 124. For example, the parameters such as the arrangement of the phase change elements 124, the cross-sectional shapes, the heights, and the like may be the same, and the phase of the reflected light may be adjusted only by the pitch and the diameter.

Figure 6:
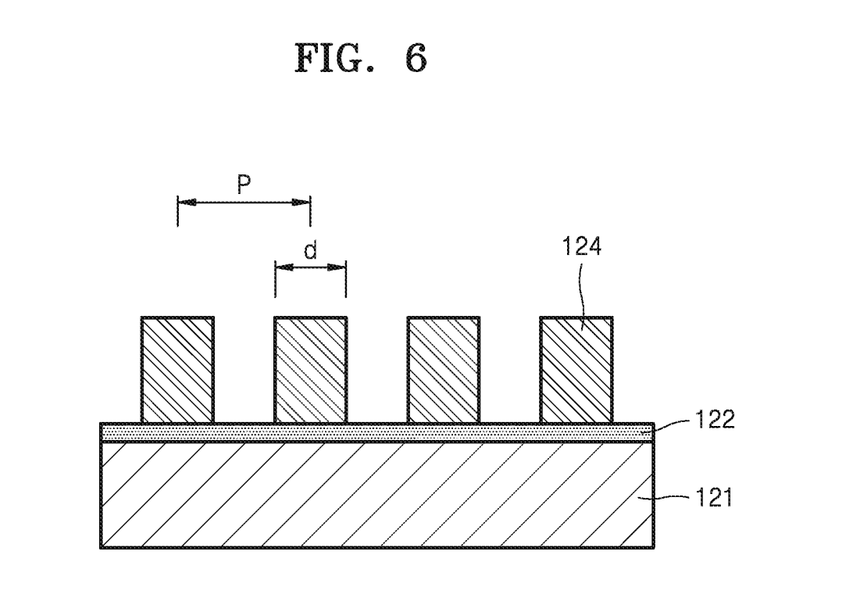
FIG. 6 is a cross-sectional view showing a diameter and a pitch of each of phase change elements of the phase change plate in the Fourier transform interferometer shown in FIG. 1.
Figure 7:
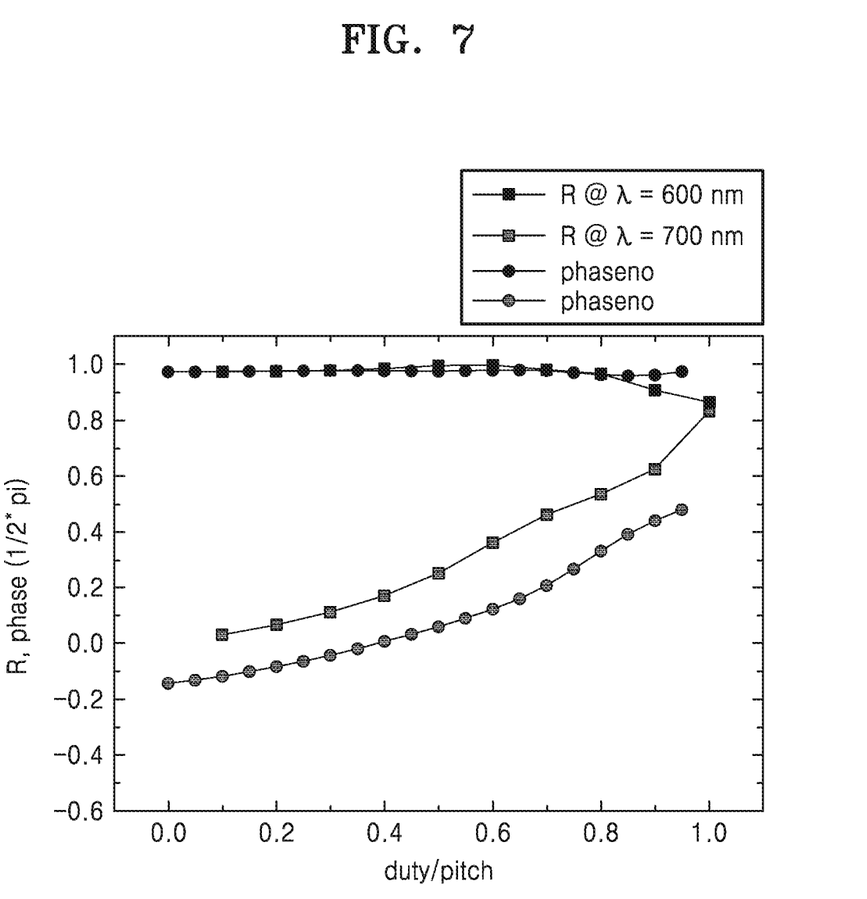
FIG. 7 is a graph exemplarily showing a phase change according to a diameter and a pitch of each of phase change elements.

FIG. 6 is a cross-sectional view showing a diameter d and a pitch P of each of the phase change elements 124 of the phase change plate 120 in the Fourier transform interferometer 100 shown in FIG. 1. FIG. 7 is a graph exemplarily showing a phase change according to the diameter and the pitch of each of the phase change elements 124. Referring to FIG. 6, the pitch P is an arrangement period of the phase change elements 124, and is a distance from a center of one of the phase change elements 124 to a center of another one of the phase change elements 124 adjacent thereto. In FIG. 7, the horizontal axis represents a ratio (d/p) between the pitch and the diameter, and the vertical axis represents a reflectance and a phase. Referring to FIG. 7, it may be seen that the ratio (d/p) between the pitch and the diameter increases with respect to an incident light of 600 nm and 700 nm, and that the phase change gradually increases. Also, it may be seen that the reflectance is almost constant regardless of the ratio (d/p) between the pitch and the diameter. Therefore, the phase of the reflected light may be adjusted by adjusting the ratio (d/p) between the pitch and the diameter.

The meta surface 123 may include a plurality of meta regions for differently changing the phase of the reflected light.

Figure 8:
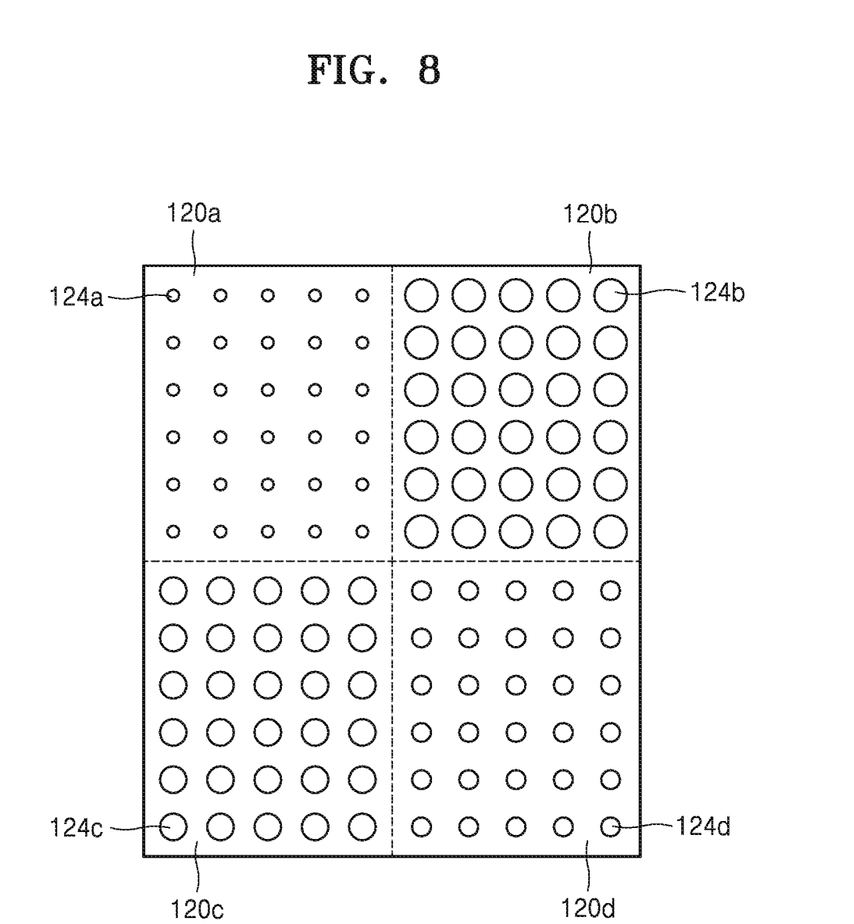
FIG. 8 is a plan view showing a schematic configuration of the phase change plate of the Fourier transform interferometer shown in FIG. 1.

FIG. 8 is a plan view showing a schematic configuration of the phase change plate 120 of the Fourier transform interferometer 100 shown in FIG. 1. Referring to FIG. 8, the meta surface 123 may include first to fourth meta regions 120a, 120b, 120c, and 120d. Although only the four meta regions 120a, 120b, 120c, and 120d are illustrated in FIG. 8, there may actually be a greater number of meta regions. The first to fourth meta regions 120a, 120b, 120c, and 120d may be configured to change a phase of a reflected light differently. To this end, a plurality of first to fourth phase change elements 124a, 124b, 124c, and 124d that are different from each other may be respectively arranged in the first to fourth meta regions 120a, 120b, 120c, and 120d. For example, the first to fourth phase change elements 124a, 124b, 124c, 124d arranged in the same meta regions 120a, 120b, 120c, and 120d all have the same diameter and pitch, and the first to fourth phase change elements 124a, 124b, 124c, and 124d arranged in the different first to fourth meta regions 120a, 120b, 120c, and 120d may be configured to have different diameters and pitches.

Then, light reflected by the phase change plate 120 may have different phases according to a local position in the phase change plate 120. In other words, the phase of the reflected light changes locally according to the position on the phase change plate 120. For example, reflected light reflected on the first meta region 120a of the phase change plate 120 may have a first phase, reflected light reflected on the second meta region 120b of the phase change plate 120 may have a second phase, the second phase being different from the first phase, reflected light reflected on the third meta region 120c of the phase change plate 120 may have a third phase, the third phase being different from the first and second phases, and reflected light reflected on the fourth meta region 120d of the phase change plate 120 may have a fourth phase, the fourth phase being different from the first to third phases.

According to the embodiment described above, because the phase change plate 120 locally changes the phase of the reflected light, a plurality of different optical path differences may occur simultaneously between light not incident on the phase change plate 120 in the incident light and the light reflected from the phase change plate 120. As a result, a large number of different interference patterns may occur simultaneously. Therefore, because the Fourier transform interferometer 100 according to the present embodiment does not include a mechanical structure for moving a mirror to change the optical path differences between the two lights incident on the photodetector 130, the Fourier transform interferometer 100 may be manufactured in a small size. For example, the Fourier transform interferometer 100 according to the present embodiment may be manufactured in a chip form and applied to a small electronic device such as a smart phone or a wearable device. Also, because a plurality of different interference patterns occur simultaneously, it is possible to analyze the incident light in real time. Further, because the phase change plate 120 may be simply manufactured by a patterning method using a photolithography process, a complicated processing operation is not required. Therefore, the manufacturing cost of the Fourier transform interferometer 100 may be reduced.

The Fourier transform interferometer 100 having the configuration shown in FIGS. 1 to 4 may be implemented having a vertical-type structure or a lateral-type structure.

Figure 9:
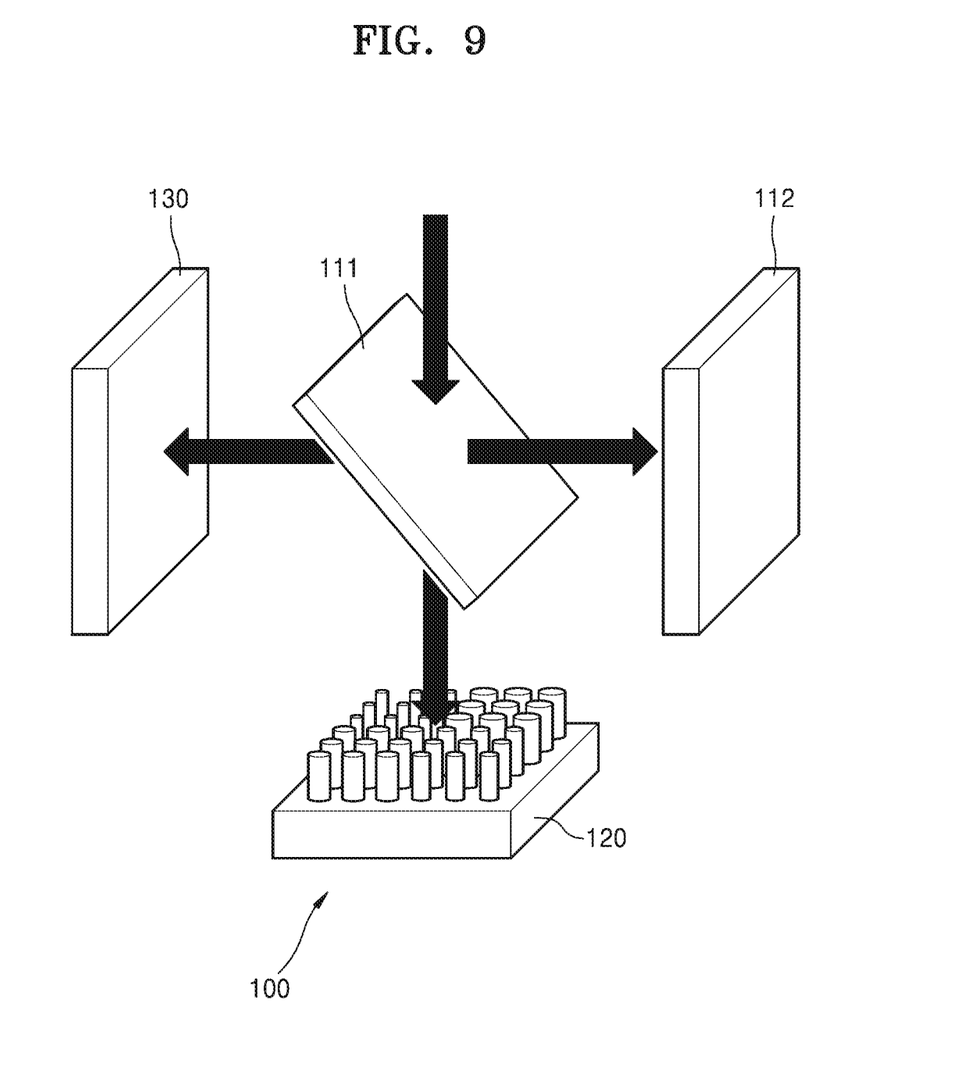
FIG. 9 is a perspective view showing a vertical-type structure of the Fourier transform interferometer shown in FIG. 1.
Figure 10:
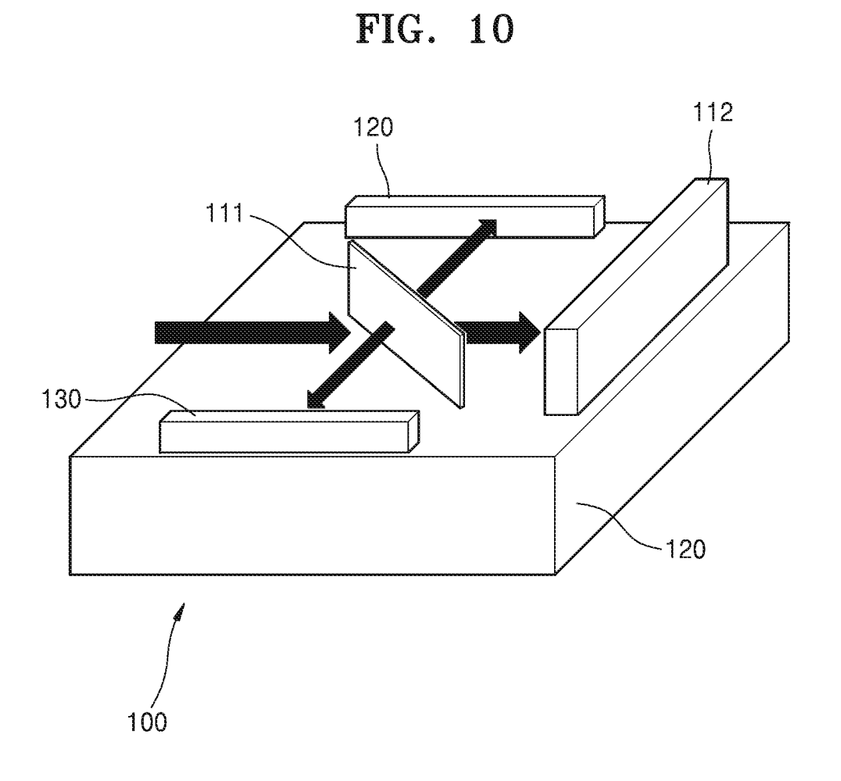
FIG. 10 is a perspective view showing a lateral-type structure of the Fourier transform interferometer shown in FIG. 1.

FIG. 9 is a perspective view showing a vertical-type structure of the Fourier transform interferometer 100 shown in FIG. 1, and FIG. 10 is a perspective view showing a lateral-type structure of the Fourier transform interferometer 100 shown in FIG. 1.

Referring to FIG. 9, the phase change plate 120 may be disposed in a bottom region of the Fourier transform interferometer 100, and the transflective mirror 111 may face an upper surface of the phase change plate 120 and be spaced apart from the phase change plate 120. The mirror 111 and the photodetector 130 may be respectively disposed on both sides of the transflective mirror 111. An incident light may be incident on the transflective mirror 111 in a vertical direction from the top to the bottom. FIG. 9 exemplarily shows the configuration shown in FIG. 1. The configurations shown in FIG. 2 through FIG. 4 may be implemented as the vertical-type structure shown in FIG. 9.

Also, referring to FIG. 10, the Fourier transform interferometer 100 may further include a flat substrate 101. In this case, all of the transflective mirror 111, the phase change plate 120, the mirror 112, and the photodetector 120 may be arranged on an upper surface of the substrate 101. In this case, the incident light may proceed in a horizontal direction and may be incident on the transflective mirror 111. FIG. 10 exemplarily shows the configuration shown in FIG. 1. The configurations shown in FIG. 2 through FIG. 4 may be implemented as the vertical-type structure shown in FIG. 9.

The Fourier transform interferometer 100 described in FIGS. 1 to 10 is a Michelson interferometer in which the phase change plate 120 changes a phase of reflected light. However, the Fourier transform interferometer 100 may be configured as Fabry-Perot interferometer in which a phase change plate changes a phase of transmitted light.

Figure 11:
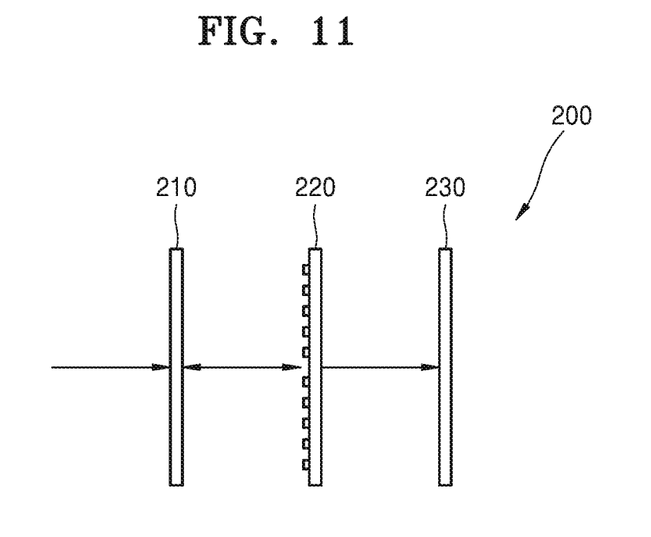
FIG. 11 shows a schematic configuration of a Fourier transform interferometer according to another embodiment.

FIG. 11 shows a schematic configuration of a Fourier transform interferometer 200 according to another embodiment. Referring to FIG. 11, the Fourier transform interferometer 200 may include a transflective mirror 210 transmitting a part of an incident light and reflecting a remaining part of the incident light, a phase change plate 220 disposed opposite to the transflective mirror 210, and a photodetector 230 disposed opposite the phase change plate 220. The photodetector 230 may be disposed on the opposite side of the transflective mirror 210 with respect to the phase change plate 220.

In the configuration of the Fourier transform interferometer 200, a part of the incident light incident on the transflective mirror 210 passes through the transflective mirror 210 and is incident on the phase change plate 220. A part of light incident on the phase change plate 220 is reflected by the transflective mirror 210 and a remaining part of the light transmits through the phase change plate 220 and is incident on the photodetector 230. A part of the light reflected by the phase change plate 220 and incident on the transflective mirror 210 may be reflected again and then may transmit through the phase change plate 220 and be incident on the photodetector 230. In the present embodiment, the phase change plate 220 may have a meta surface that locally changes a phase of the transmitted light. Therefore, the photodetector 230 may detect an interference pattern between the light transmitted through the phase change plate 220. For example, the photodetector 230 may detect an interference pattern between light transmitting through the phase change plate 220 once and light reciprocating one or more times between the phase change plate 220 and the transflective mirror 210. Then, a spectrum distribution of the incident light may be analyzed by a Fourier analysis method using the interference patterns detected by the photodetector 230.

An incident light incident on the transflective mirror 210 from the outside, which is light to be analyzed, may be light directly from an external test target light source such as a laser or reflected, transmitted or scattered from an external sample or subject. When the Fourier transform interferometer 200 is used for analyzing a sample, the Fourier transform interferometer 200 may further include a light source.

Figure 12:
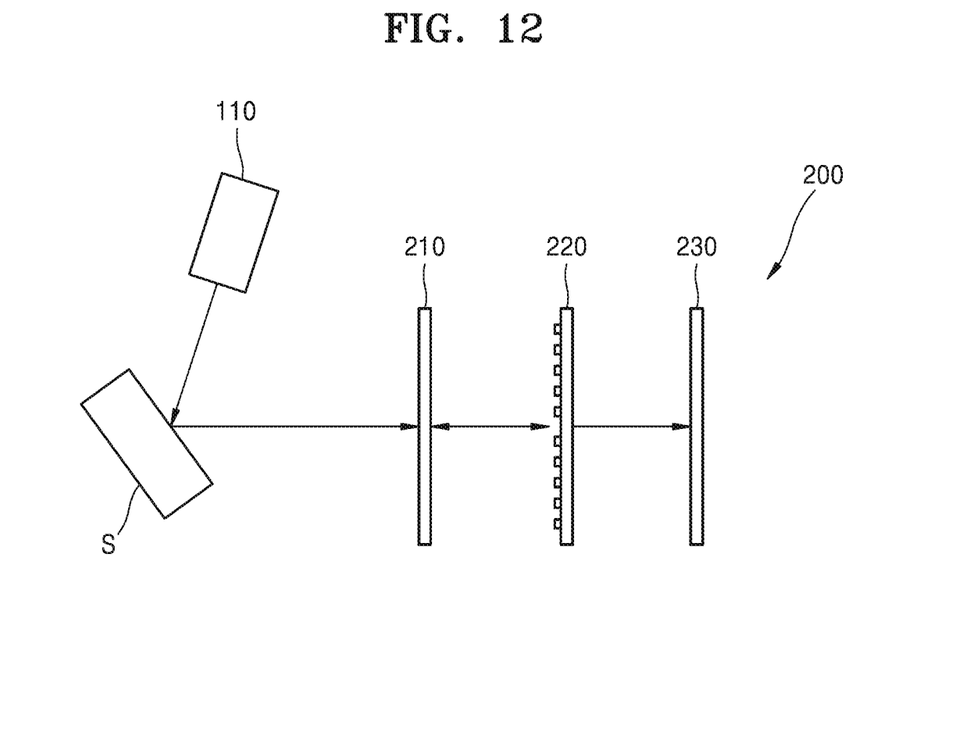
FIG. 12 shows a schematic configuration of a Fourier transform interferometer according to another embodiment.

FIG. 12 shows a schematic configuration of the Fourier transform interferometer 200 according to another embodiment. Referring to FIG. 12, the Fourier transform interferometer 200 may further include the light source 110 for irradiating the sample S with light. In this case, the sample S, the light source 110, and the transflective mirror 210 may be arranged where light reflected, transmitted or scattered from the sample S irradiated by the light source 110 may be incident on the transflective mirror 210.

Figure 13:
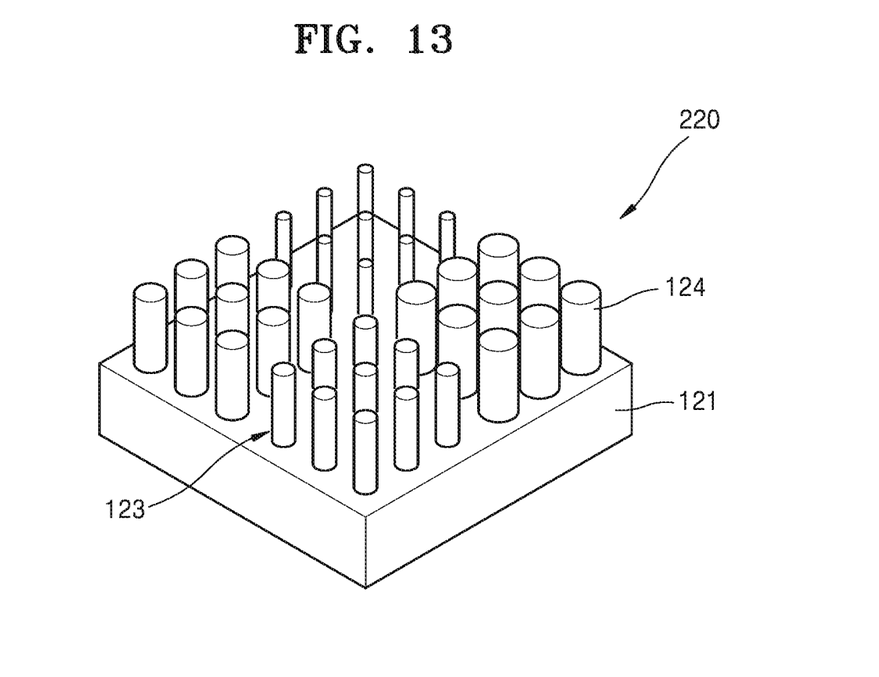
FIG. 13 is a perspective view showing a schematic configuration of a phase change plate of the Fourier transform interferometer shown in FIG. 11.

FIG. 13 is a perspective view showing a schematic configuration of the phase change plate 220 of the Fourier transform interferometer 200 shown in FIG. 11. Referring to FIG. 13, the phase change plate 220 for locally and differently changing a phase of a transmitted light may include the substrate 121 and the meta surface 123 disposed on the substrate 121 and locally and differently changing a phase of a reflected light. As described with reference to FIG. 8, the meta surface 123 may include a plurality of meta regions for differently changing the phase of the reflected light, and the phase change elements 124 having a plurality of different diameters may be arranged in the plurality of meta regions. Therefore, compared with the phase change plate 120 of FIG. 5, the phase change plate 220 shown in FIG. 13 may have the same configuration as that of the phase change plate 120 shown in FIG. 5 except that the phase change plate 220 shown in FIG. 13 does not include the reflective layer 122.

The substrate 121 of the phase change plate 220 may be formed of a material having transparency with the light to be analyzed. For example, the substrate 121 may be formed of glass or a transparent plastic material. Instead, the substrate 121 may have transflectivity to reflect a part of the incident light to the transflective mirror 210.

The Fourier transform interferometer 200 having the configuration shown in FIGS. 11 and 12 described above may also be implemented having a vertical-type structure or a lateral-type structure.

Figure 14:
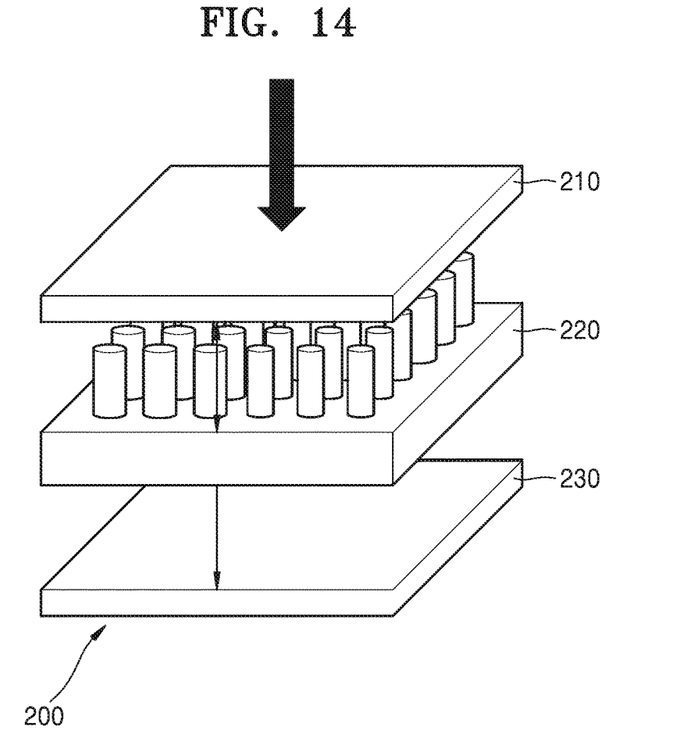
FIG. 14 is a perspective view showing a vertical-type structure of the Fourier transform interferometer shown in FIG. 11.
Figure 15:
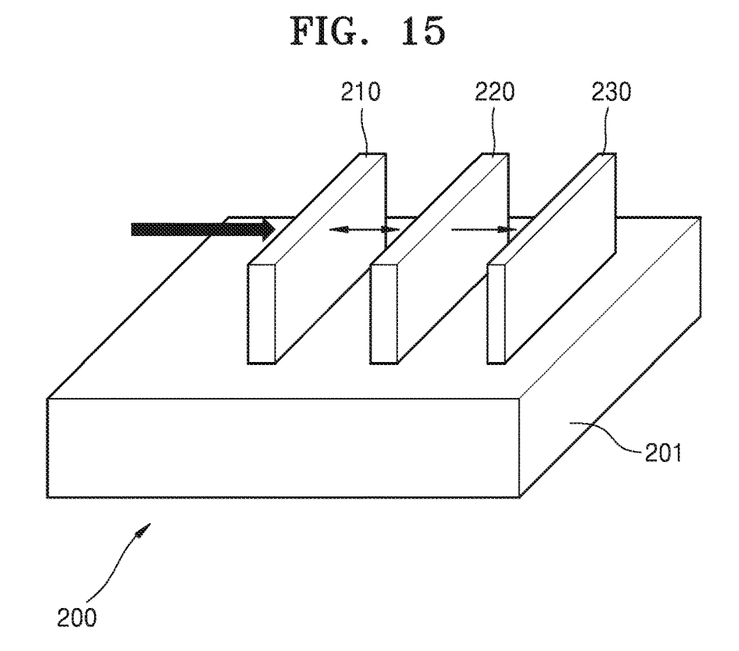
FIG. 15 is a perspective view showing a lateral-type structure of the Fourier transform interferometer shown in FIG. 11.

FIG. 14 is a perspective view showing a vertical-type structure of the Fourier transform interferometer 200 shown in FIG. 11, and FIG. 15 is a perspective view showing a lateral-type structure of the Fourier transform interferometer 200 shown in FIG. 11.

Referring to FIG. 14, the photodetector 230 may be disposed in a bottom region of the Fourier transform interferometer 200 and the phase change plate 220 may face an upper surface of the photodetector 230 and be spaced apart from the photodetector 230. The transflective mirror 210 may face an upper surface of the phase change plate 220 and be spaced apart from the phase change plate 220. An incident light may travel in a perpendicular direction from the top to the bottom and be incident on the transflective mirror 210.

Referring to FIG. 15, the Fourier transform interferometer 200 may further include a flat substrate 201. The transflective mirror 210, the phase change plate 220, and the photodetector 230 may be sequentially arranged in a lateral direction on an upper surface of the substrate 201. In this case, the incident light may travel in a horizontal direction and be incident on the transflective mirror 210.

It may be understood that the Fourier-transform interferometer using a meta surface described herein may be considered in a descriptive sense only and not for purposes of limitation. Descriptions of features or aspects within each embodiment may be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A Fourier-transform interferometer comprising:
a transflective mirror configured to transmit a first part of a first light that is incident, and reflect a remaining part of the first light;
a phase change plate disposed opposite to the transflective mirror, the phase change plate comprising, a meta surface comprising a plurality of phase change elements having different diameters and configured to locally and differently change a phase of a second light that is incident; and a transflective substrate configured to transmit a second part of the second light, and reflect a third part of the second light, the meta surface being disposed on the transflective substrate; and a photodetector configured to detect an interference pattern between a third light that is transmitted through the phase change plate.

2. The Fourier-transform interferometer of claim 1, wherein the plurality of phase change elements have columnar shapes vertically protruding from the transflective substrate.

3. The Fourier-transform interferometer of claim 1, wherein the phase change plate comprises a first meta region and a second meta region that differently change the phase of the third part of the second light that is reflected.

4. The Fourier-transform interferometer of claim 3, wherein the phase change plate comprises first phase change elements disposed in the first meta region, and second phase change elements disposed in the second meta region.

5. The Fourier-transform interferometer of claim 4, wherein each of the first phase change elements has a first diameter, and each of the second phase change elements has a second diameter different from the first diameter.

6. The Fourier-transform interferometer of claim 1, wherein each of the different diameters of the plurality of phase change elements is less than a wavelength of light to be analyzed.

7. The Fourier-transform interferometer of claim 1, wherein each of refractive indices of the plurality of phase change elements is higher than a refractive index of the transflective substrate.

8. The Fourier-transform interferometer of claim 1, wherein the photodetector, the phase change plate, and the transflective mirror are sequentially arranged in a vertical direction.

9. The Fourier-transform interferometer of claim 1, further comprising a substrate,
wherein the transflective mirror, the phase change plate, and the photodetector are sequentially arranged in a lateral direction on the substrate.

10. The Fourier-transform interferometer of claim 1, further comprising a light source configured to radiate a fourth light toward a sample.

* * * * *